United States Patent
Yang

[11] Patent Number: 5,810,687
[45] Date of Patent: Sep. 22, 1998

[54] POWER WINDOW TRANSMISSION

[76] Inventor: Nan-Shan Yang, No. 16, Shin Shing Street, Yeong Kang City, Tainan Shiann, Taiwan

[21] Appl. No.: 861,508

[22] Filed: May 22, 1997

Related U.S. Application Data

[63] Continuation-in-part of Ser. No. 689,849, Aug. 15, 1996, abandoned.

[51] Int. Cl.$^6$ .................................. F16H 7/06; F16H 7/20
[52] U.S. Cl. ............................................. 474/147; 474/148
[58] Field of Search ...................... 474/140, 144, 474/147, 148, 150, 154

[56] References Cited

U.S. PATENT DOCUMENTS

| | | | |
|---|---|---|---|
| 2,640,367 | 6/1953 | Reiser | 474/150 X |
| 3,885,471 | 5/1975 | Morine et al. | 474/144 |
| 4,609,365 | 9/1986 | Eberle | 474/147 X |
| 4,767,386 | 8/1988 | Spaggiari | 474/148 |
| 5,440,944 | 8/1995 | Chen | 474/148 X |

*Primary Examiner*—Thomas R. Hannon
*Attorney, Agent, or Firm*—Pro-Techtor International

[57] ABSTRACT

A power window transmission includes a loop-like endless chain (12) surrounding and engaging opposed driving and driven sprocket (20, 18). The driving sprocket (20) is mechanically coupled to a motor (26) and the driven sprocket (18) is driven by the chain (12) to drive window crank handle shaft coupled thereto to operate the window. The sprockets (18, 20) are encased in separate and individual casings (32, 34) each of which is fixed to the car door structure with a bracket (64) provided with stepless-adjustable fastening device (68) fastened precisely to the car door structure. The sections of the chain located outside the sprocket casings (32, 34) are enclosed in flexible tubes (80) incorporating spring-based slack take-up device (81) arranged between an end of each of the tubes (80) and one of the sprocket casings (32, 34) to take up slacks of the tubes (80) following the change of length of the chain (12). The casings (32, 34) are also provided with lips (40) located around the inner rims thereof to support the sprocket (18, 20) against the thrusts applied thereto by the motor shaft and the window crank handle shaft.

26 Claims, 17 Drawing Sheets

POWER WINDOW TRANSMISSION

This is a continuation-in-part application of applicant's patent application Ser. No. 08/689,849 filed on Aug. 15, 1996 now abandoned.

The present invention relates to a car power window transmission system and in particular to a flexible transmission system suitable for use in cars of different manufacturers.

Car power windows usually comprise an electrical motor to drive the window glasses upward/downward through a transmission system for opening/closing the car window. Some of the cars are not originally equipped with power window system and in some cases, the owners of the cars may want to modify the manually operated window to power window. Power window transmission systems for such a purpose have been developed. Some of the conventional power window transmissions for such a purpose are done by means of gear system, such as Taiwan patent publication No. 269252 (application No. 84201152) published on Jan. 20, 1996. Using gears to construct the power window transmission has the disadvantage that it is not flexible in installation of the gear-type transmission. Namely, the gear type transmission is "rigid" and in general "not adjustable" to accommodate the different configurations of different car designs. In other words, the motor which serves as the mechanical power source of the power window has to be precisely positioned and fixed at predetermined location relative to the window glass and this position may not be arbitrarily selected as desired. Besides, the gear system occupies a large space which increases the difficulty and complication of installing the power window transmission system.

There is also "flexible" power window transmission available in the market, such as Taiwan patent publication No. 245177 (application No. 83204178) published on Apr. 11, 1995 which discloses a flexible power window transmission structure comprising a loop-like endless chain surrounding two sprockets. One of the sprockets serves as a driving sprocket driven by a motor and the other sprocket is coupled to the rotational shaft of the window crank handle of the manually-operated window glass for transmitting the rotation of the motor to the window handle crank shaft to move the window glass with the handle crank removed in advance. Both the sprockets are encased in a casing defining therein a U-shaped channel for the chain to extend therethrough and engage the sprockets. Each of the casings has a central hole sized in correspondence to the sprocket associated therewith and each of the holes has an inner flange to support the sprocket to rotate thereabout.

The engagement between the chain and the sprockets allows the rotation of the motor to be transmitted to the window glass and this transmission structure provides the flexibility of the relative location between the motor and the window glass which allows the motor to be mounted at any desired location relative to the window, such as to arrange the chain to define a right angle or an even greater angle or to twist the chain. This provides the power window transmission with a greater flexibility. A similar flexible power window transmission is also disclosed in U.S. Pat. No. 4,767,386 issued on Aug. 30, 1988.

Such conventional flexible power window transmission systems, although providing flexibility in mounting the systems, yet have several disadvantages. For example, in twisting or bending the flexible chain, the section of the chain located at one side of the sprockets becomes tensioned, while the other side does not and may even be in a slack condition. This causes wearing and abrasion problem of the parts and thus reduces the overall service life.

Furthermore, in the conventional flexible power window transmission system, when the window is completely closed or opened, the motor does not stop immediately. This causes tension in the chain so that when the motor actually stops, the chain is in a tensioned condition. This also brings about the reliability and wearing problem of the transmission system.

Besides, the chain and sprocket system of the conventional flexible power window transmission is fixed inside the car door structure by means of bracket members connected between the casings of the sprockets and the car door structure. In the conventional design, the bracket members are provided with a plurality of bolt holes which may be selectively fixed to one or more threaded holes formed on the car door structure so as to provide flexibility of mounting the casings of the sprockets to the car door structure. This, however, limits the adjustment of location of the bracket members relative to the car door structure for the holes of the bracket members are formed in advance and it may occur that none of the holes exactly matches the threaded hole of the car door structure in spatial relationship. Thus, there is often a position error in matching the holes of the bracket members to the threaded hole(s) of the car door structure.

Moreover, the casings of the sprockets in the conventional design provide no means to support axial thrust applied to the sprockets. This may also cause reliability problem.

It is therefore desired to provide an improvement over the prior art flexible power window transmission system discussed above to overcome or eliminate the drawbacks of the prior art structure.

Thus, it would be desirable to be able to provide a flexible power window transmission which can be mounted in any orientation and position within the car door structure and has slack take-up device to take up the slack of the encasing tubes surrounding the chain following change of length of the chain.

It would also be desired to be able to provide a power window transmission of which the bracket members are capable of stepless adjustment in spatial location with respect to the threaded holes provided inside the car door structure to which the bracket members are to be secured by bolts, and to be able to provide a power window transmission of which the casings of the sprockets are provided with thrust support member to support the thrust applied to the sprockets and thus elongating the service life of the power window transmission system.

According to the present invention, there is provided a power window transmission comprising a loop-like endless chain surrounding and engaging a driving sprocket at one end and a driven sprocket at the opposite end. The driving sprocket is mechanically coupled to a motor to be driven thereby for moving the chain. The driven sprocket is driven by the chain to drive window crank handle shaft that is coupled thereto to perform opening/closing operation of the window. The sprockets are encased in separate and individual casings each of which is fixed to the car door structure with a bracket. The bracket is provided with stepless-adjustable fastening device to be fastened to the car door structure in a precise manner. The sections of the chain that are located outside the sprocket casings are enclosed in flexible tubes which comprise a spring-based slack take-up device arranged between an end of each of the tubes and at least one of the sprocket casings to take up the slack of the tube following the change of length of the chain. The casings are also provided with lips located around the inner rims thereof to support the sprocket against the thrusts applied thereto by the motor shaft and the window crank handle shaft.

The present invention will be better understood from the following description of preferred embodiments thereof with reference to the attached drawings, wherein.

Figure 16:
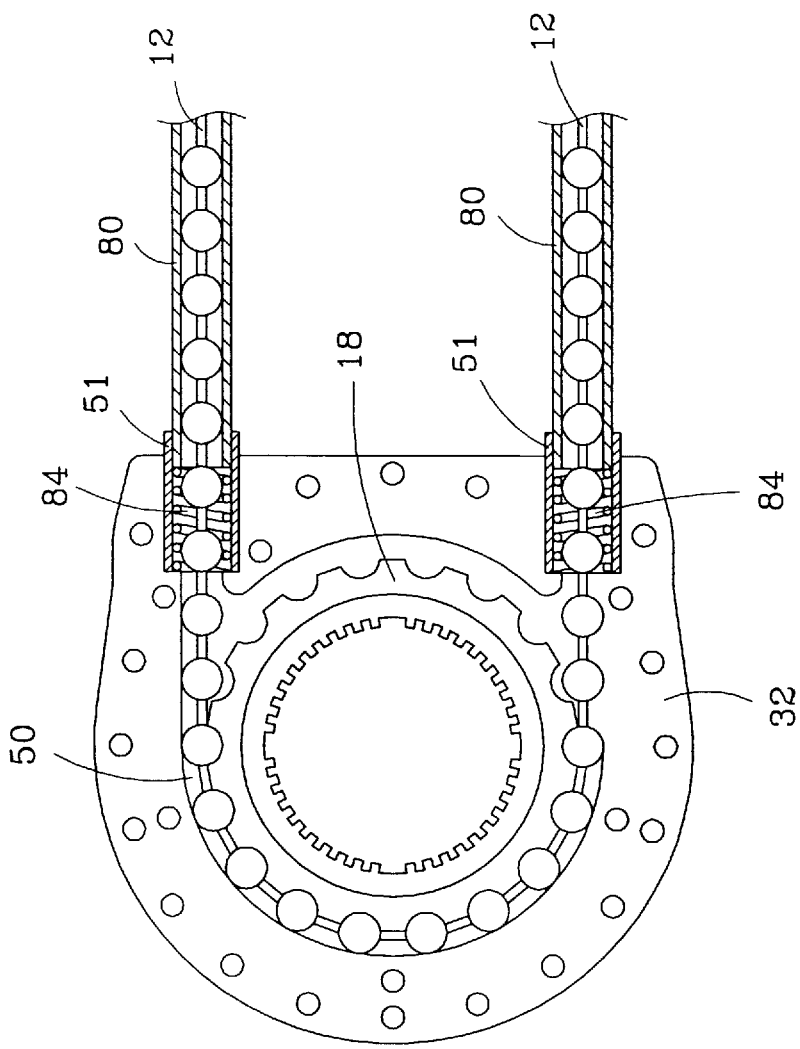
Figure 17:
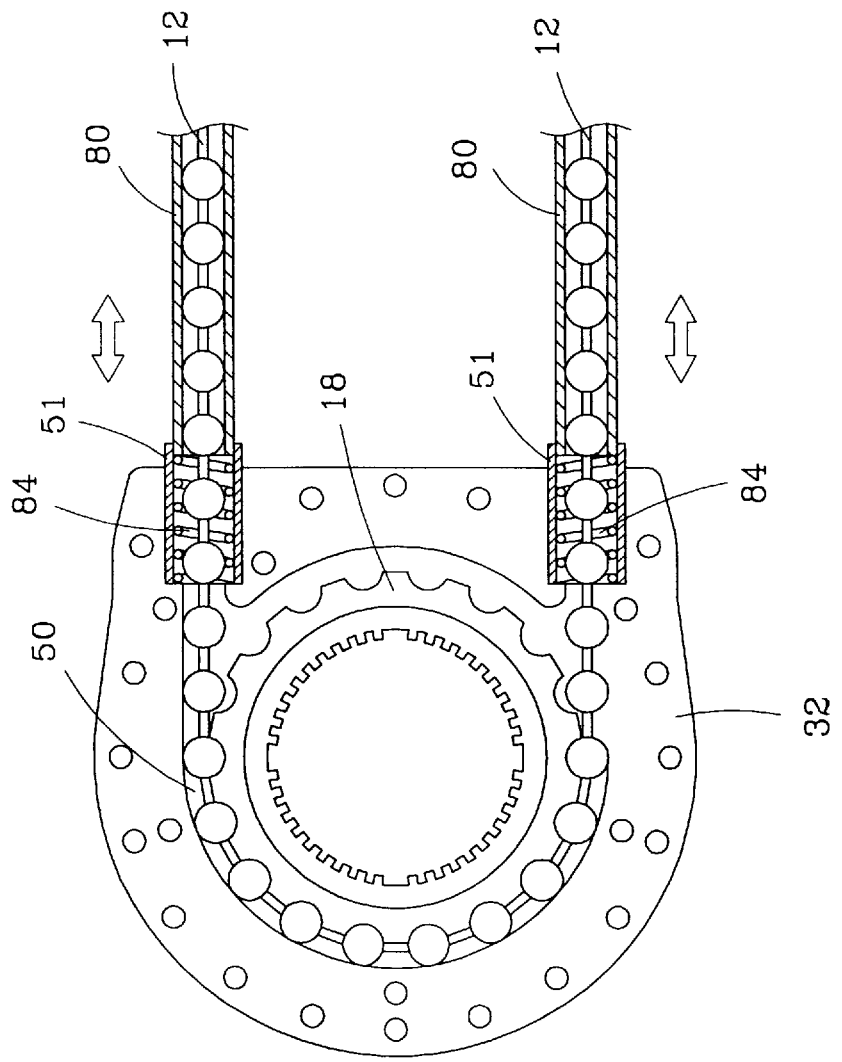

FIG. 16 is a plan view of the window crank handle side structure of the power window transmission system in accordance with the second embodiment of the present invention, with the slack take-up device shown in a sectioned fashion to illustrate the inside structure thereof, and FIG. 17 is a view similar to FIG. 16, but showing the slack take-up device in accordance with the second embodiment of the present invention in taking up the tube slack.

Figure 1:
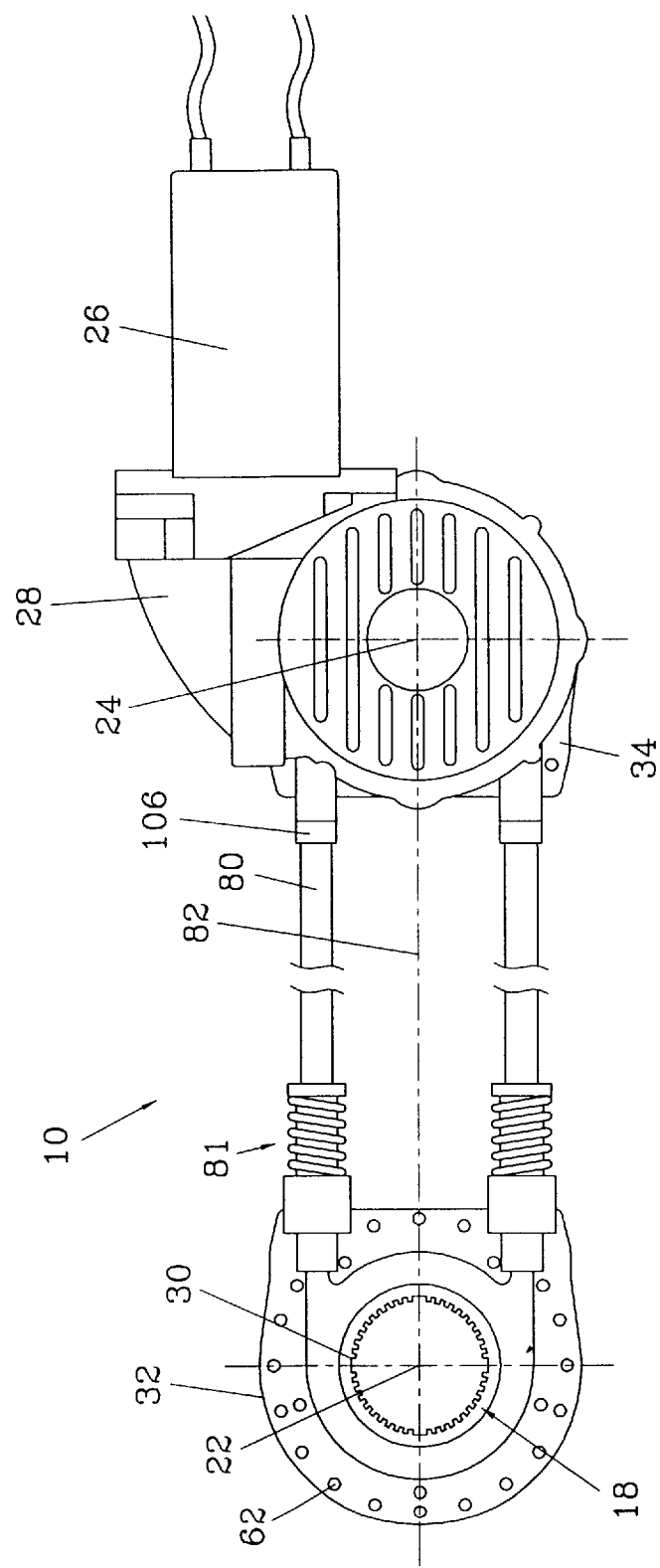
FIG. 1 is plan view showing a power window transmission system constructed in accordance with the present invention.

With reference to the drawings and in particular to FIG. 1, wherein a power window transmission system constructed in accordance with the present invention, generally designated with reference numeral 10, is shown, the power window transmission system 10 comprises an endless chain 12 which is arranged in the form of a loop (see FIGS. 4, 5 and 6) to be movable in an endless and repeated manner. The chain 12 comprises generally a flexible wire or cable 14 on which a plurality of rigid beads 16 are fixed in an equally-spaced manner. The cable 14 may be made of any suitable flexible material. The chain 12 is known and will not be further described.

Figure 5:
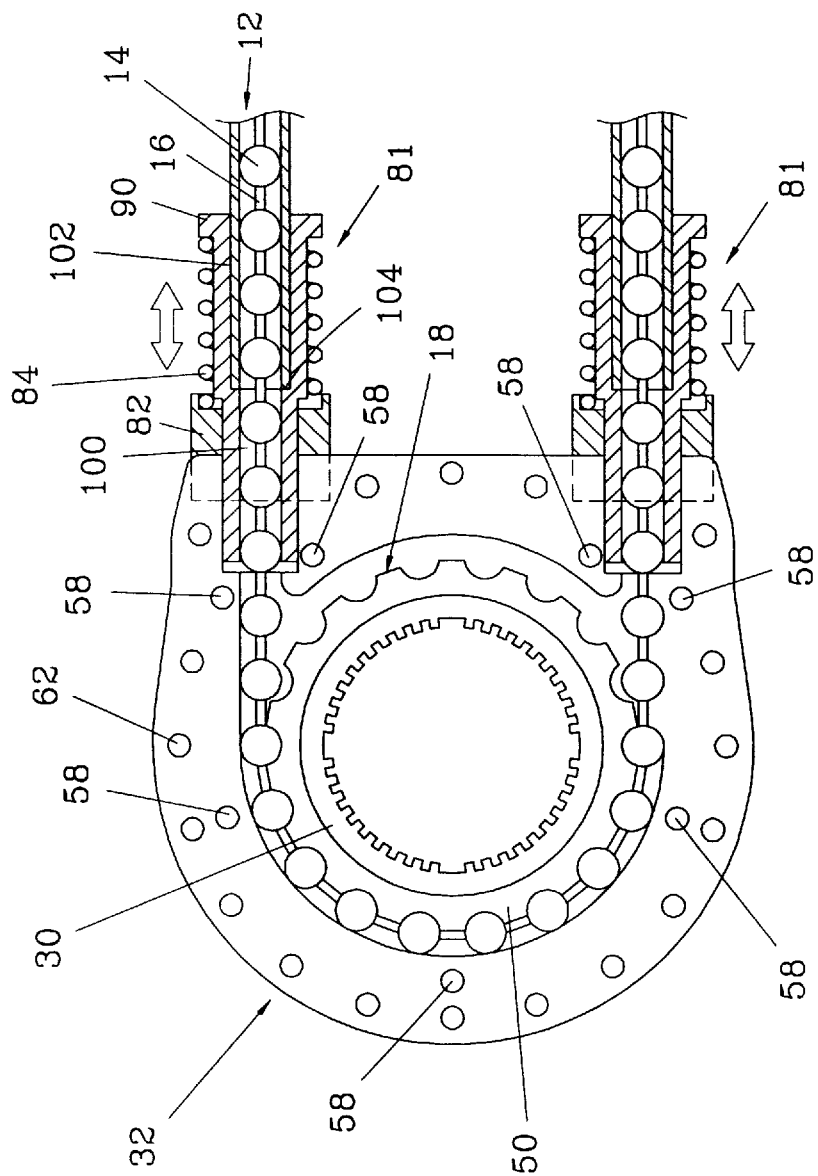
FIG. 5 is a view similar to FIG. 4, but showing the slack take-up device in taking up the chain slack.
Figure 6:
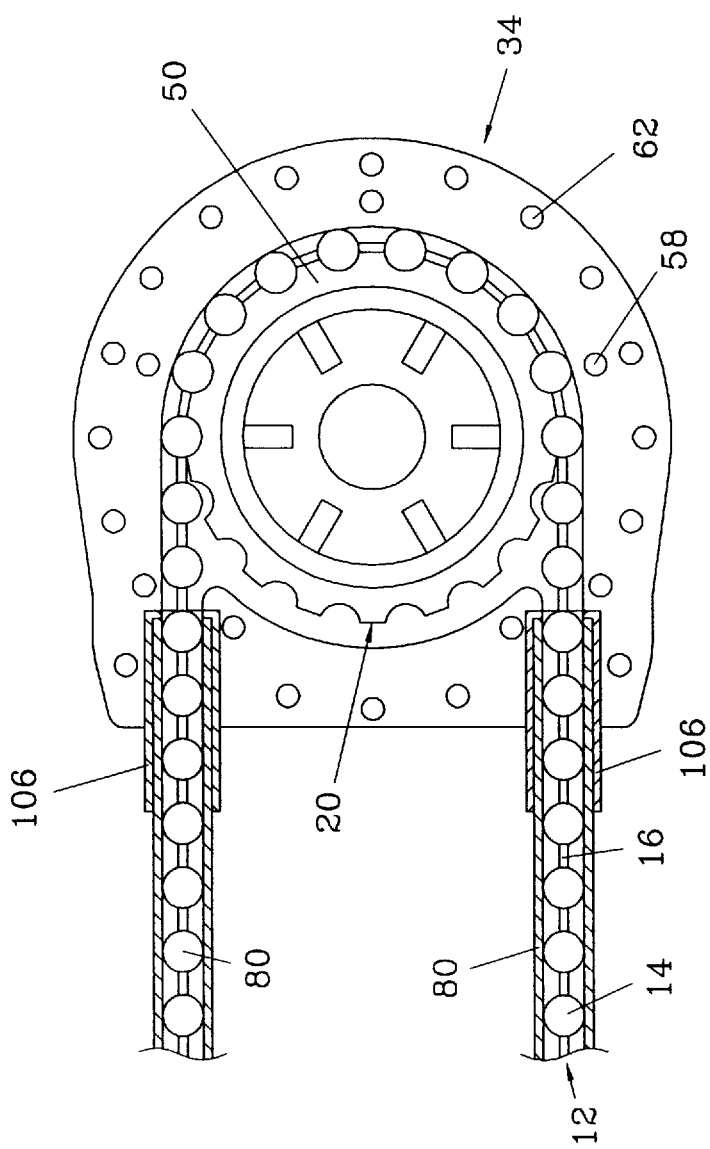
FIG. 6 is a plan view of the motor side structure of the power window transmission system of the present invention, partially sectioned to show the relationship between the chain enclosure tubes and the protective sheaths.
Figure 7:
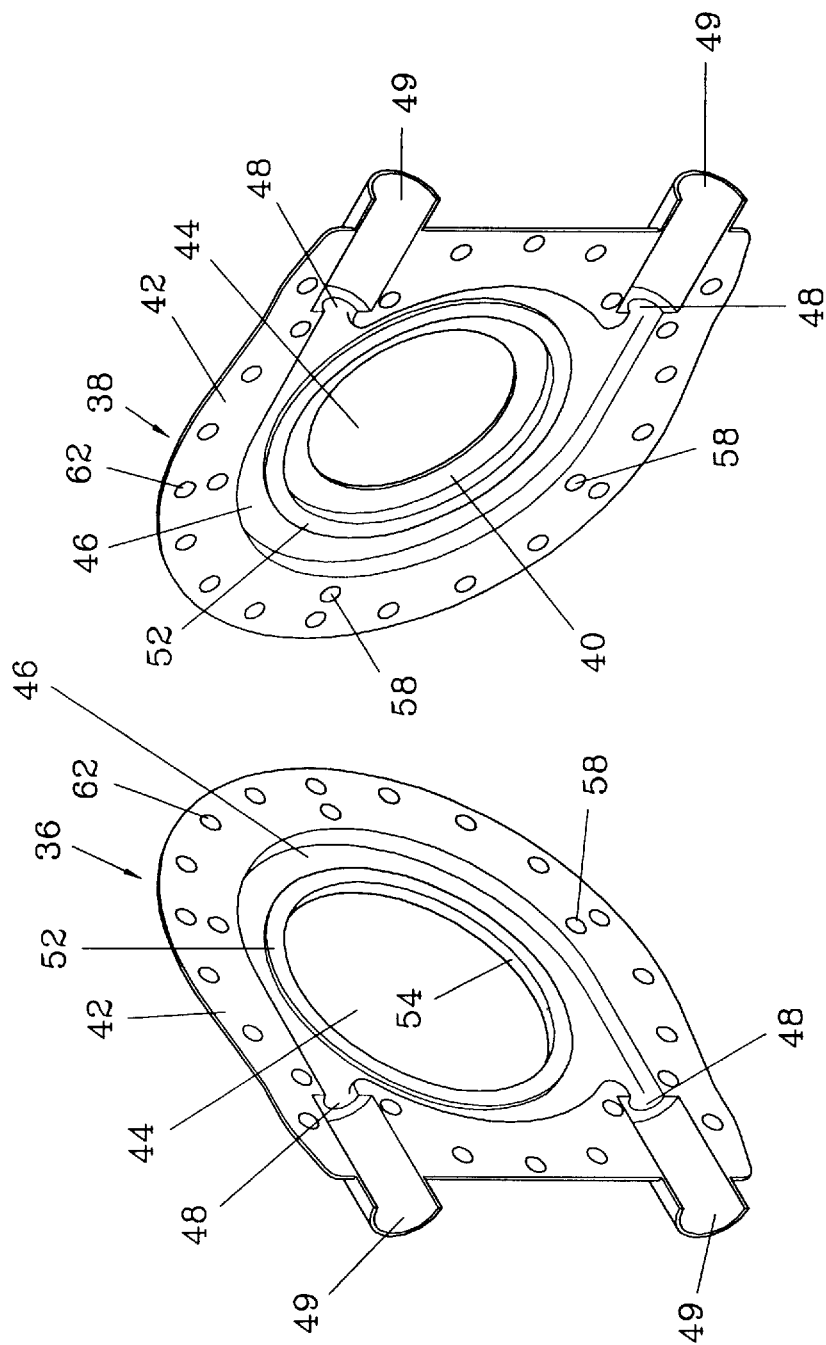
FIG. 7 is an exploded perspective view of the motor side sprocket casing.
Figure 8:
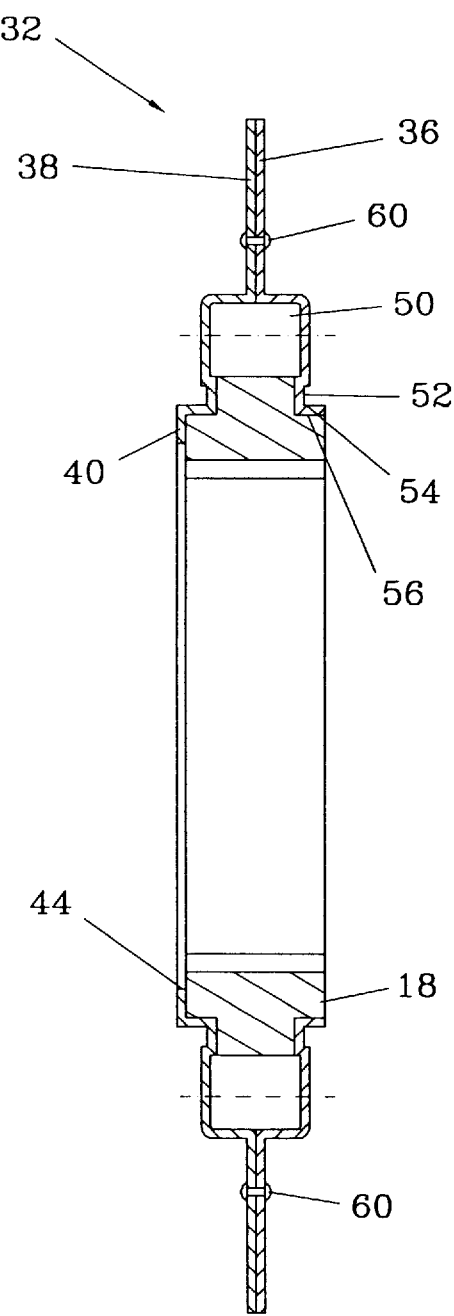
FIG. 8 is a cross-sectional view of the window crank handle side structure of the power window transmission system of the present invention.
Figure 9:
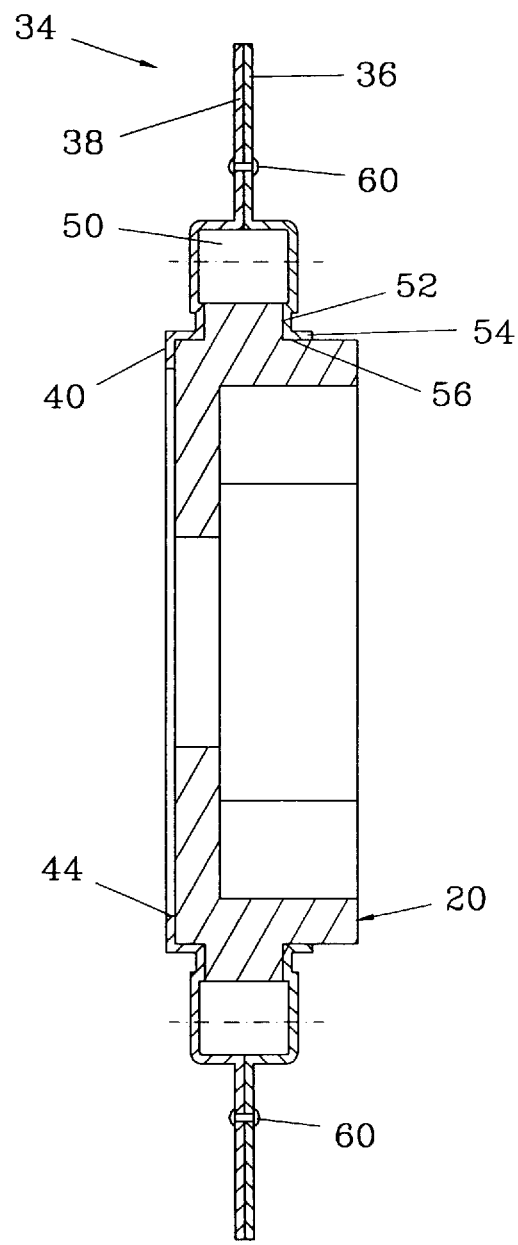
FIG. 9 is a cross-sectional view of the motor side structure of the power window transmission system of the present invention.

The chain 12 surrounds and drivingly engages a driven sprocket 18 (see FIGS. 4, 5 and 8) and a driving sprocket 20 (see FIGS. 6 and 9). The two sprockets 18 and 20 are spaced from and opposite to each other with the chain 12 surrounding them to define chain sections located on two sides of the sprockets 18 and 20 which will be referred to as side sections of the chain hereinafter. The sprockets 18 and 20 comprise a plurality of teeth engageable with the beads 16 of the chain 12. With the movement of the chain 12, the sprockets 18 and 20 rotate about respective rotational axes 22 and 24 so as to transmit the rotational motion from the driving sprocket 20 to the driven sprocket 18. The driving sprocket 20 is mechanically coupled to and driven by a motor 26 to transmit the rotational motion from the motor 26 to the chain 12, while the driven sprocket 18 is driven by the chain 12 to rotate a window crank handle shaft (not shown) coupled thereto for opening/closing the car door window. To simplify the description, the portion of the transmission system 10 at the side of the driving sprocket 20 will also be referred to as "motor side", while that of the side of the driven sprocket 18 "handle side".

In the embodiment illustrated in FIG. 1, the output shaft of the motor 26 is substantially perpendicular to the rotational axis 24 of the driving sprocket 20 and a mechanical coupling device 28, such as worm and gear assembly, is arranged therebetween to transmit the rotational motion of the motor 26 to the driving sprocket 20. On the other hand, at the handle side of the transmission system 10, the driven sprocket 18 has a plurality of teeth 30 to drivingly engage teeth (not shown) formed on the window crank handle shaft to rotate the window crank handle shaft (not shown).

To support the rotational motion of the sprockets 18 and 20, the chain 12 has a casing 32 or 34 located at each of the motor side and the handle side of the transmission system 10 to encase the sprockets 18 and 20. In the embodiment illustrated, the two casings 32 and 34 are substantially identical to each other and each comprises two shell members 36 and 38, respectively referred to as front and rear shell members herein for the purpose of distinction. The two shell members 36 and 38 are substantially identical to each other with the only exception being that the rear shell member 38 is provided with a thrust support lip 40, while the front shell member 36 is not. The thrust support lip 40 will be further described.

Since the front shell member 36 and the rear shell member 38 are substantially identical, in the following description, only the rear shell member 38 will be described. However, it is to be understood that the description of the rear shell member 38 is also applicable to the front shell member 36 and the same reference numerals will be used to designate the same members or elements of the two shell members 36 and 38.

The rear shell member 38 comprises a plate 42 having a circular through hole 44 substantially centered on the plate 42. The circular hole 44 has a center substantially coincident with the rotational axis 24 or 26 of the respective sprocket 18 or 22. The plate 42 further comprises an annular groove 46 substantially concentrically surrounding the hole 44 with two parallel extension grooves 48 extending from and tangential to the annular groove 46. When the front and rear shell members 36 and 38 are mated together to form the casing 32 or 34, the grooves 46 and 48 together define a chain channel 50 through which the chain 12 extends (see FIGS. 8 and 9). The annular groove 46 and the sprockets 18 and 20 are sized to allow the sprocket teeth of the sprockets 18 and 20 to locate within the chain channel 50 to be engageable by the chain 12.

Each of the extension grooves 48 is provided with an expanded entry section 49 at the remote ends thereof (namely the ends remote from the annular groove 46) which are co-axially extending from the extension groove 48 to an edge of the plate 42. The expanded sections 49 define two entry bores 51 (FIG. 2) on each of the casings 32 or 34 when the shell members 36 and 38 are mated together. The chain 12 enters each of the casing 32 and 34 from one of the entry bores 51, extends through the chain channel 50 defined by the annular grooves 46 and then exits the casing at the opposite bore 51. The entry bores 51 will be further discussed hereinafter.

A circumferential flange 52 is provided around the diameter of the through hole 44 of each of the shell members 36 and 38. The flange 52 is recessed relative to the plane of the plate 42, but has a depth smaller than the annular groove 46 so as to be raised with respect to the annular groove 46. A gap is thus formed between the flanges 52 of the two shell members 36 and 38 when they are mated together to allow the teeth of the respective sprocket 18 or 20 to extend therethrough and into the chain channel 50 for engagement with the chain 12.

These flanges 52 also serve to securely hold the sprocket 18 or 20 thereon and this is achieved by providing the flange 52 with a cylindrical inner rim 54 around the hole 44 and substantially co-axial with the rotational axis 22 or 24 of the sprocket 18 or 20 and providing the respective sprocket 18 or 20 with an annular shoulder 56 to rest on the inner rim 54.

In the rear shell member 38, a circumferential lip or flange, serving as the thrust support lip 40, is provided, extending inward from the inner rim 54 against which a portion of the respective sprocket 18 or 20 lies (see FIGS. 8 and 9) so as to resist the thrust that is applied to the sprocket 18 or 20.

In the operation of the power window, the mechanical coupling device 28 that drives the driving sprocket 20 and the window crank handle shaft that is driven by the driven sprocket 18 both may generate a thrust to the sprockets 20 and 18. In the conventional design, the thrust is completely supported by the gap defined between the flanges 52 of the shell members 36 and 38. This adversely affects the rotation of the sprockets 20 and 18 within the casings 32 and 34. In the present invention, the thrust is also and in general supported by the thrust support lip 40 so that the rotation of the sprockets 18 and 20 will be more smooth and un-obstructed.

Further, the lips 40 also serve to protect the sprockets 18 and 20 from being damaged by the force occurring in mounting the transmission system 10 to the car door structure.

The front and rear shell members 36 and 38 may be fixed together by means of any known mechanical fasteners, such as rivets or screws. In the embodiment illustrated, the front and rear shell members 36 and 38 are each provided with a plurality of apertures 58 (FIGS. 4–7) through which rivets 60 (FIGS. 8 and 9) extend to secure the two shell members 36 and 38 together.

Figure 10:
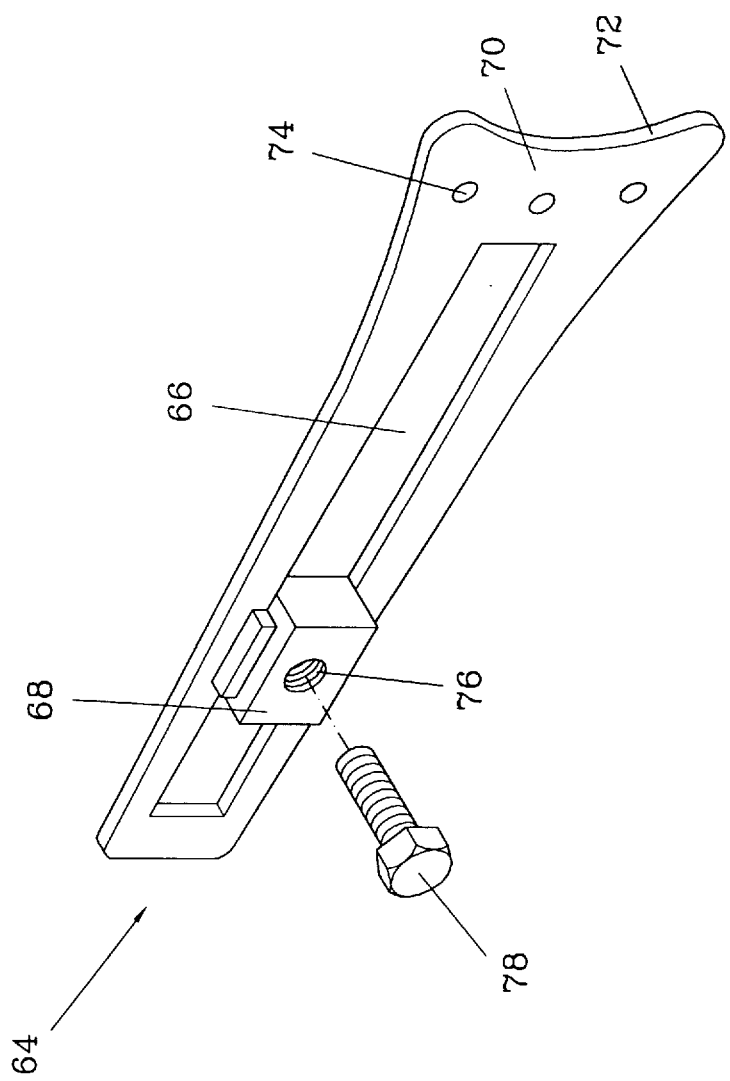
FIG. 10 is a perspective view showing the stepless-adjustable bracket in accordance with the present invention.
Figure 11:
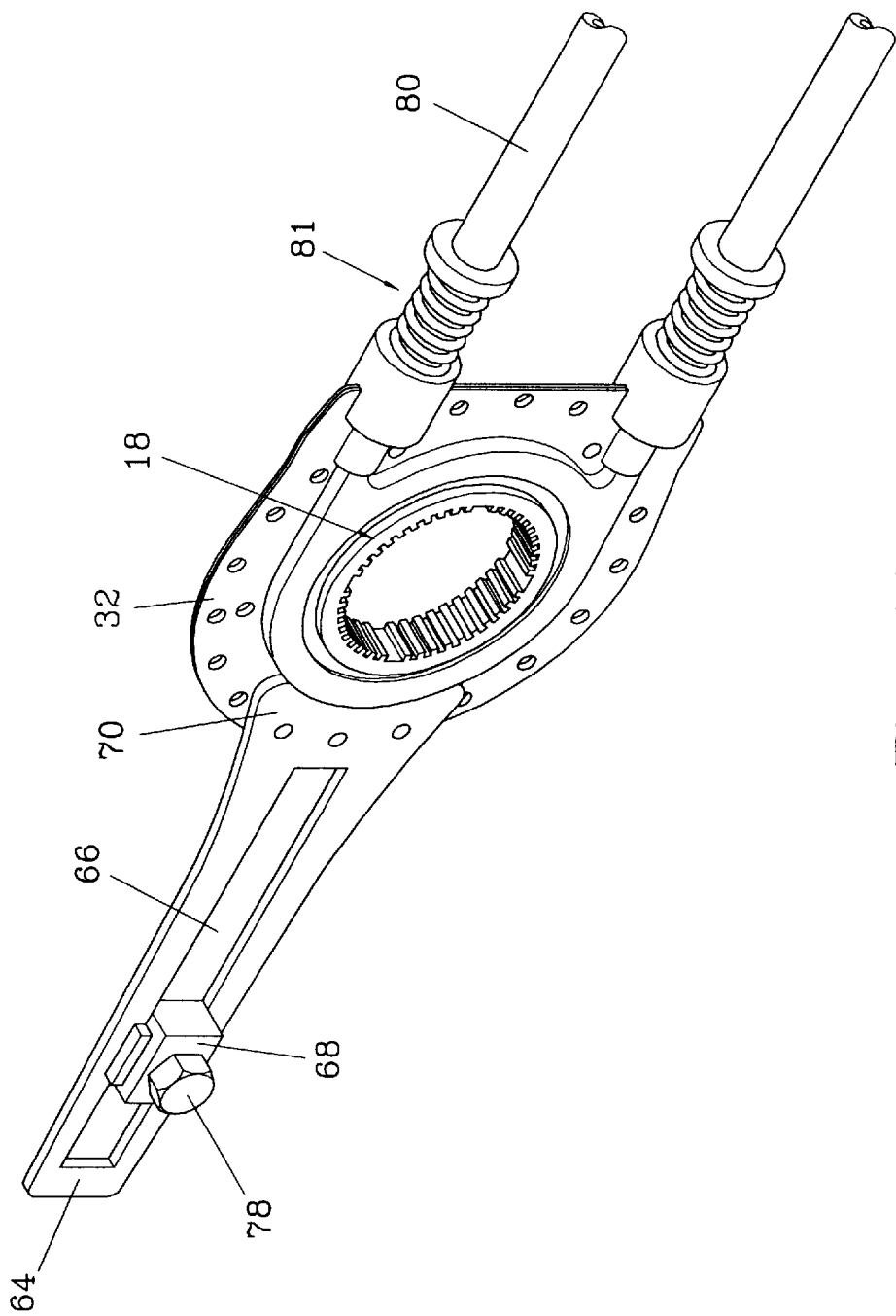
FIG. 11 is a perspective view showing the window crank handle side casing of the power window transmission of the present invention with the stepless-adjustable bracket member secured thereon.

Further, each of the casings 32 and 34 is provided with a plurality of mounting holes 62 which are arranged to be equally spaced along a circular path concentric with the through hole 44 of the shell members 36 and 38 that define the casing 32 or 34 to allow a bracket member 64 to be fastened thereto. FIG. 10 shows a perspective view of the bracket member 64 and FIG. 11 shows the bracket member 64 fastened to the handle side casing 32. The bracket 64 is generally an elongated rectangular plate, having a lengthwise elongated slot 66 within which a slide block 68 is received. The slide block 68 is movable along the slot 66 and may be secured at any position along the slot 66 by means of a bolt 78 which threadingly engages a threaded hole 76 formed on the slide block 68.

The bracket member 64 is provided with a connection section 70 at one lengthwise end thereof, having an arc end edge 72 accommodating the outer configuration of the chain channel 50. A plurality of holes 74 are provided on the connection section 70 (three such holes 74 visible in FIG. 10) and arranged to be equally spaced along an arc having a radius of curvature of the circular path of the mounting holes 62 of the casing 32 or 34. The spacing between the holes 74 is corresponding to that of the mounting holes 62 so that by placing the bracket member 64 on the respective casing 32 or 34 to have the holes 74 match the mounting holes 62 and threading screws (not shown) through both holes 74 and mounting holes 62, the bracket member 64 is secured to the casing 32 or 34.

The threaded hole 76 of the slide block 68 is a through hole through which the bolt 78 is threaded to have a free end of the bolt 78 extending out of the threaded hole 76. The bolt 78 may then be threaded into a threaded hole (not shown) provided inside the car door structure to secure the bracket 64 and thus the respective casing 32 or 34 fastened thereto to the car door structure. Tightening the bolt 78 to the threaded hole of the car door structure also serves to secure the slide block 68 in position within the slot 66. The movability of the slide block 68 along the slot 66 provides a stepless adjustment of the bolt 78 relative to the threaded hole that is previously formed inside the car door structure so that precisely mounting the bracket member 64 with respect to the threaded hole of the car door structure can be achieved.

Figure 12:
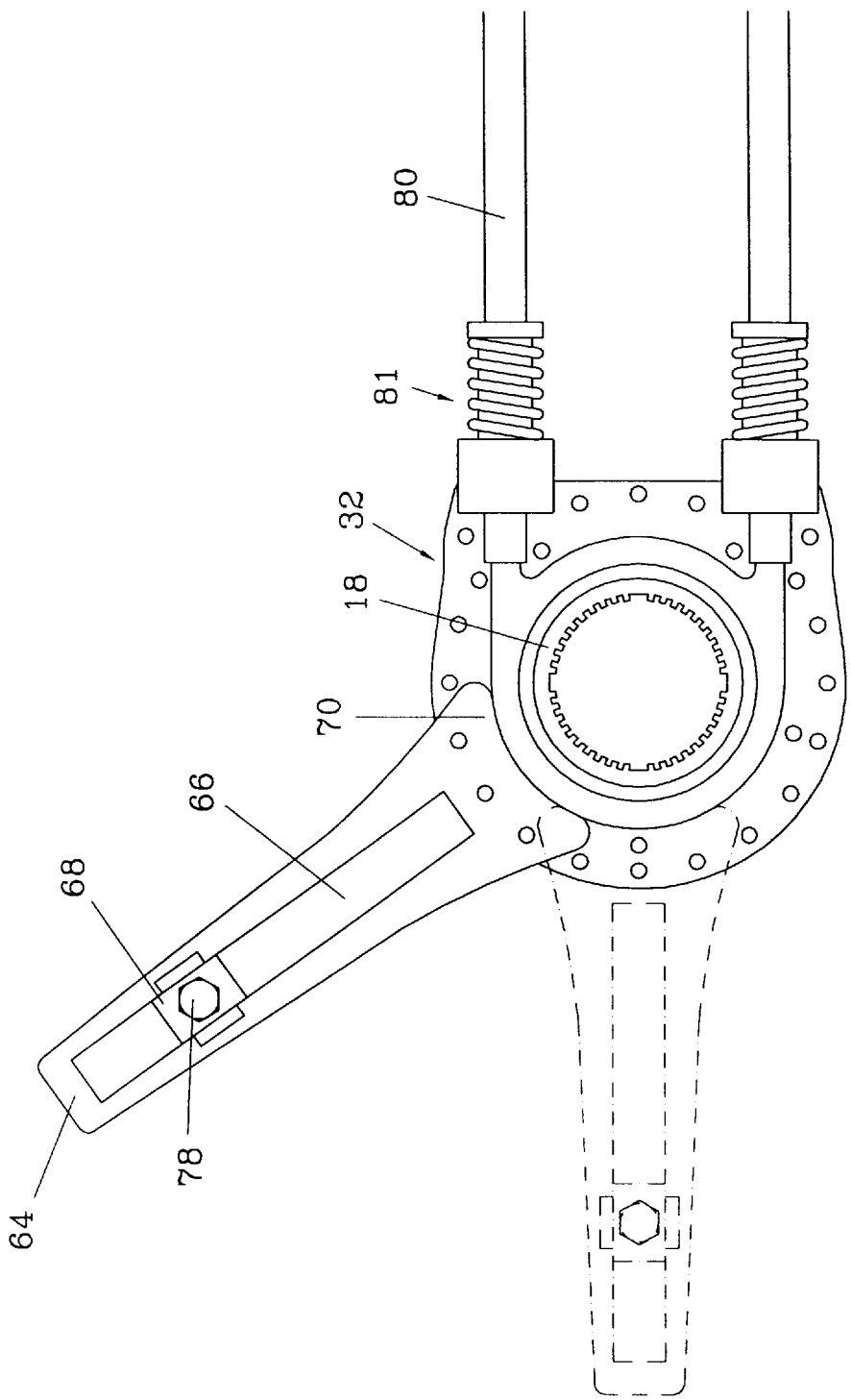
FIG. 12 is a plan view showing the adjustment of the location of the bracket relative to the window crank handle side casing of the power window transmission of the present invention.

FIG. 12 shows two different positions where the bracket member 64 may be secured to the casing 32, in which one position is shown in phantom lines and is also shown in FIG. 11 and the other in solid lines. The re-location of the bracket member 64 on the casing 32 is achieved by releasing the bracket member 64 from the casing 32, moving the bracket member 64 relative to the casing 32 until the holes 74 of the bracket member 64 match the desired mounting holes 62 of the casing 32 and re-securing the bracket member 64 to the casing 32. This is also applicable to the motor side casing 34.

Figure 2:
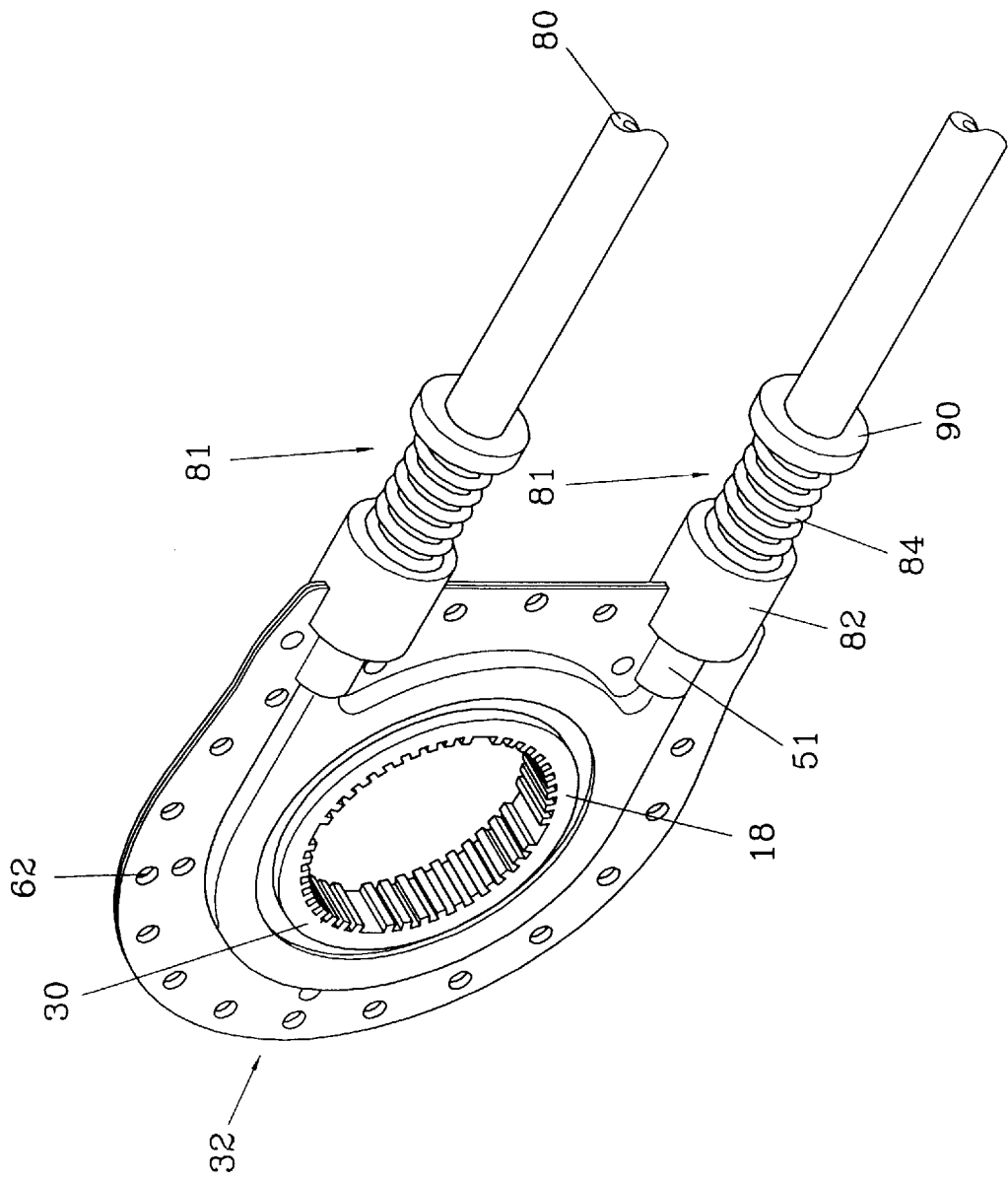
FIG. 2 is an enlarged perspective view of the window crank handle side structure of the power window transmission system of the present invention.
Figure 3:
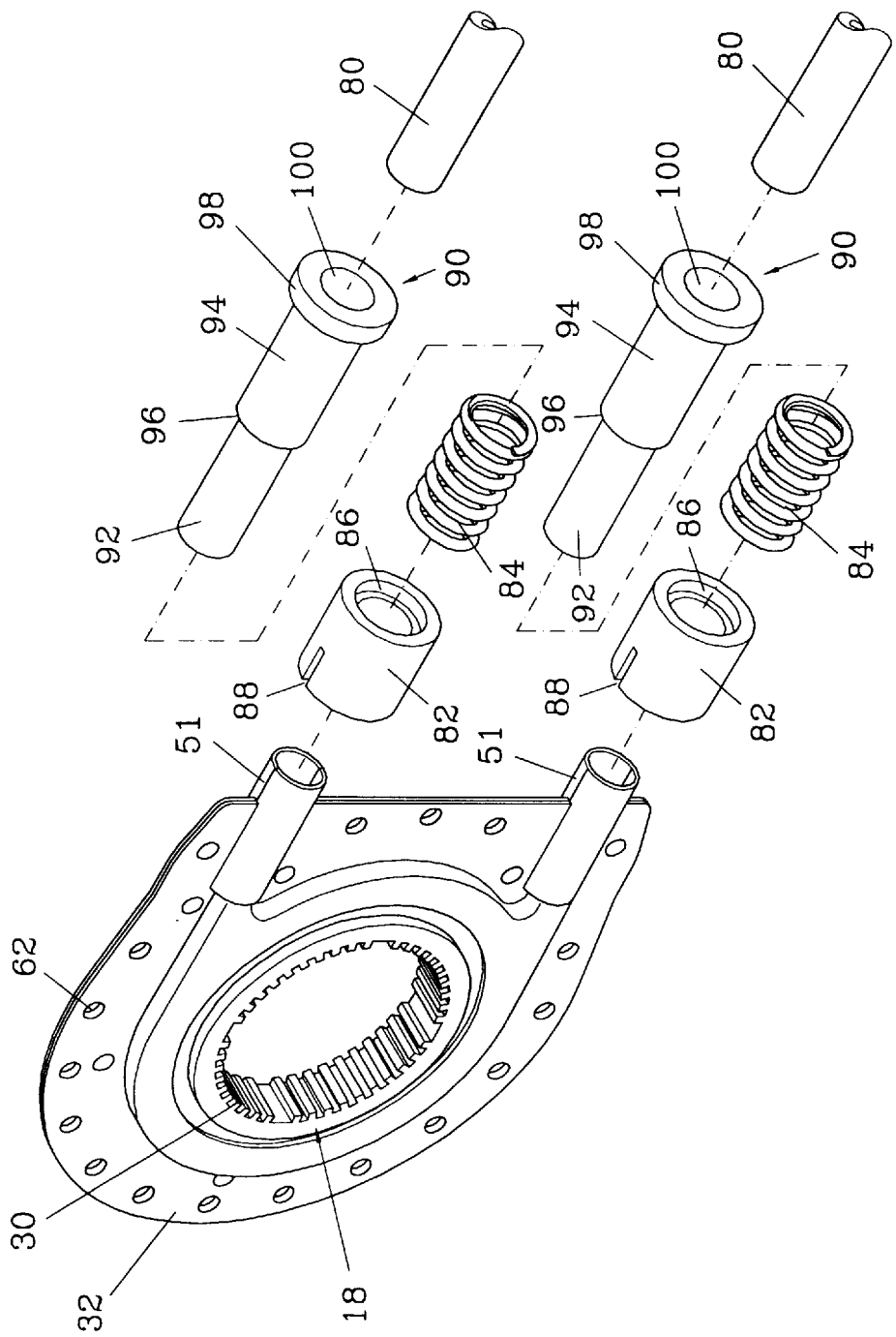
FIG. 3 is an exploded perspective view of the window crank handle side structure of the power window transmission system of the present invention.
Figure 4:
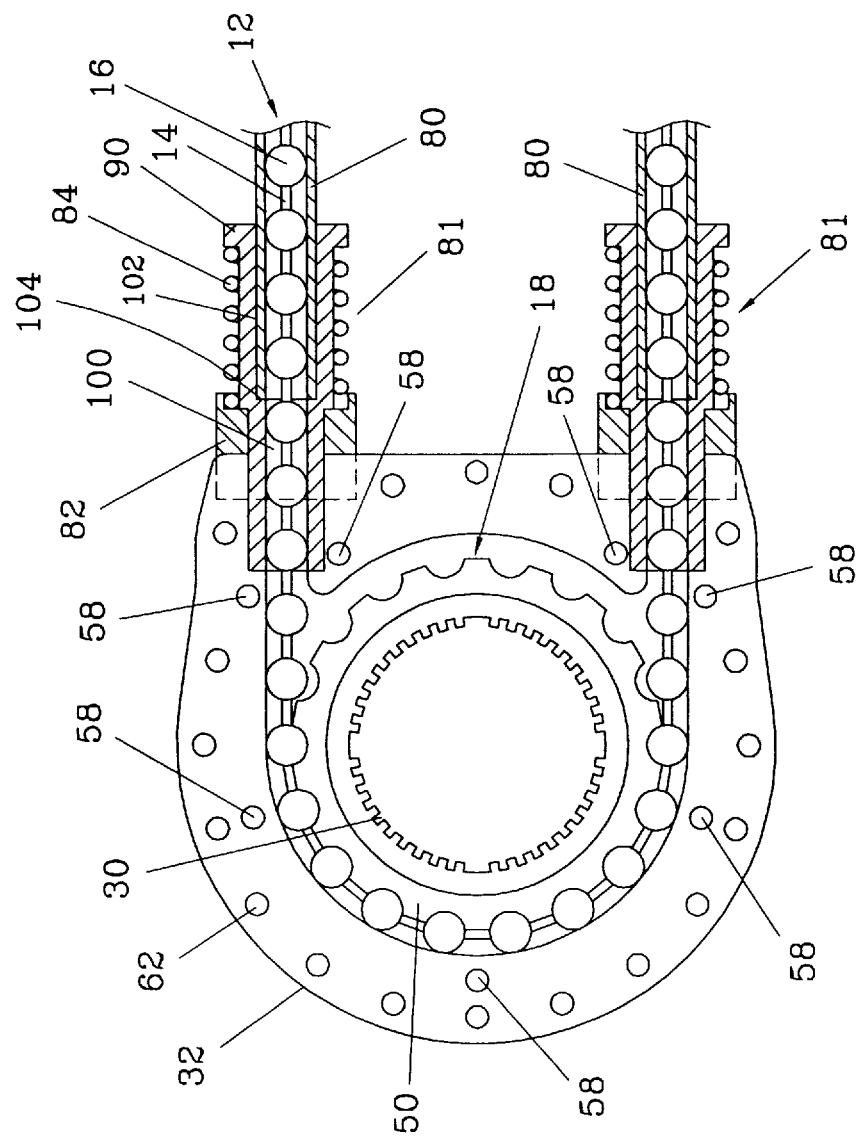
FIG. 4 is a plan view of the window crank handle side structure of the power window transmission system of the present invention, partially sectioned to show the inside structure of the slack take-up device.

Referring to FIGS. 1–6 again, the handle side casing 32 and the motor side casing 34 are spaced from each other so as to expose two side sections of the chain 12 respectively extending between the entry bores 51 of the two spaced casings 32 and 34. A tube 80 is provided to enclose each of the two side sections of the chain 12 and allow the chain 12 to move therein, as shown in FIGS. 4–6. These tubes 80 are made of soft and flexible material so as to be bendable and twistable. The term "twist" or "twistable" used herein means the two side sections of the chain 12, together with the enclosure tubes 80, are capable to be bent to be non-parallel with an imaginary line, designated with reference numeral 82 in FIG. 1, extending between the rotational axes 22 and 24 of the sprockets 18 and 20, including intersection or non-intersection of the two tubes 80.

With particular reference to FIGS. 2 and 3, wherein a spring-based slack take-up device 81 mounted between an end of each of the tubes 80 and one of the casings 32 or 34 (which is the handle side casing 32 in the embodiment illustrated) to allow the end of the tube 80 to be movable between a first position where the end of the tube 80 is located closest to the casing 32 and a second position where the end of the tube 80 is distant from the casing 32.

The spring-based slack take-up device 81 comprises a spring holder 82 having a central bore with an inside opening fit over each of the entry bores 51 of the handle side casing 32 and an opposite outside opening to receive an end of a pre-compressed helical spring 84 which rests on an inner circumferential flange 86 formed inside the bore of the spring holder 82. Preferably, the spring holder 82 is provided with diametrically symmetric notches or slits 88 to receive an edge of the plates 42 of the front and rear shell members 36 and 38 of the casing 32 therein in mounting the spring holder 82 to the casing 32.

A cylindrical plug 90 comprises a first section 92 of a first diameter, a second section 94 of a second diameter greater than the first diameter and connected to the first section 92 to define therebetween a circumferential shoulder 96 and an end flange 98 formed on the second section 94 to be opposite to the first section 92 with a central bore 100 extending through the whole plug 90. The cylindrical plug 90 is fit into the helical spring 84 from a second end of the spring to have the first section 92 received within the entry bore 51 with the shoulder 96 abutting against the inner flange 86 of the spring holder 82. The end flange 98 serves to support the second end of the helical spring 84 so as to hold the helical spring 84 between the inner flange 86 of the spring holder 82 and the end flange 98 of the plug 90.

The central bore 100 of the plug 90 allows the chain 12 and the enclosure tube 80 to fit therein. Preferably, the central bore 100 is provided with an expanded section 102 to receive the tube 80 therein. The expanded section 102 defines a circumferential shoulder 104 to support the end of the tube 80 thereon (see FIG. 4) for positioning the tube 80 inside the central bore 100.

The pre-compressed helical spring 84 biases the plug 90, together with the tube 80 fit therein, from the first position of the tube 80 toward the second position thereof, see FIG. 5, when the chain 12 is stretched.

Thus, in accordance with the present invention, the power window transmission system 10 is arranged to allow the plugs 90 and the tubes 80 fit therein to be located at the first position (FIG. 4) when both side sections of the chain 12 have substantially the same tension therein. When the length of the chain 12 is changed due to wearing and/or adjustment thereof so as to have the sections of the chain 12 stretched or loosened, the slack take-up devices 81 allow the tubes 80 to move relative to the casing 32 for eliminating the slacks of the tubes 80 surrounding the chain 12 in both side sections thereof. If only one side section of the chain 12 needs to be adjusted, then only the associated plug 90 is moved.

Instead of disposing the slack take-up devices 81 on the handle side casing 32, it is also possible to mount the slack take-up devices on the motor side casing 34 to achieve the same function of slack take-up Alternatively, it is also possible to mount slack take-up devices on both the handle side casing 32 and the motor side casing 34. However, there is no need to do so for the sake of cost saving.

Without the slack take-up devices 81 mounted on the motor side casing 34, a gap exists between each of the tubes 80 and the associated entry bore 51 of the motor side casing 34, as the entry bores 51 are sized to receive the plug 90 of the slack take-up device 81 therein. To avoid any problem that may be caused by the gap, a tubular sheath 106 (FIG. 6) made of a rigid material, such as steel, is provided to tightly fit onto the end of each of the tubes 80. The sheath 106 is sized to snugly fit into the respective entry bore 51 of the motor side casing 34. The sheath 106 may protect the end of the respective tube 80 from continuously striking the entry bore 51 during the operation of the transmission system 10.

In FIGS. 13–17, a power window transmission system constructed in accordance with a second embodiment of the present invention is shown, the second embodiment power window transmission system which is designated with reference numeral 10' for distinction is in general similar to the first embodiment power window transmission system 10 shown in FIGS. 1–12 with the only difference occurring at the slack take-up device which will be further described hereinafter. For simplicity, members or parts of the second embodiment that are identical to the counterpart of the first embodiment will be labeled with the same reference numerals and some of the detailed description of these identical members or parts will be neglected.

Figure 13:
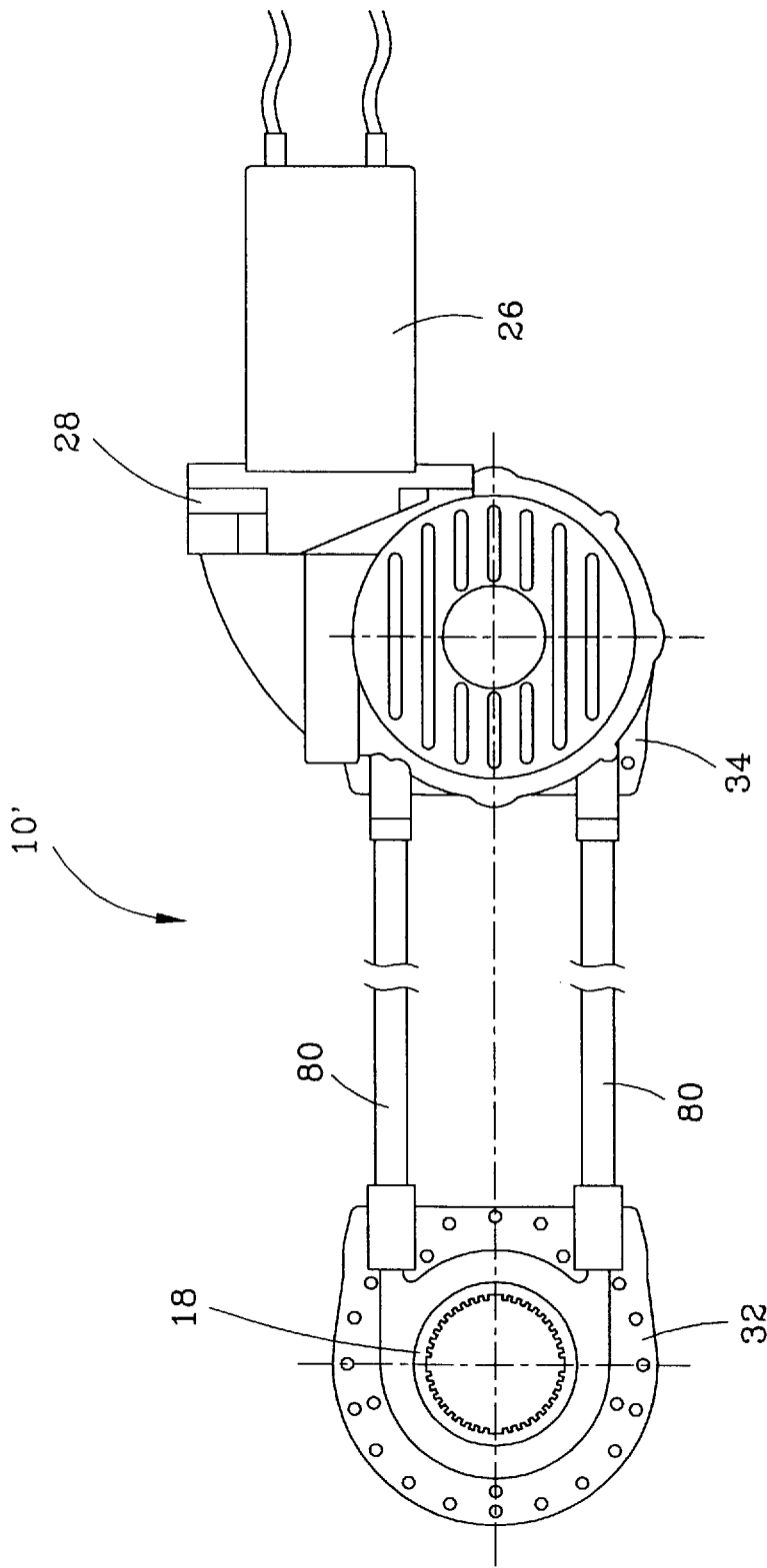
FIG. 13 is a plan view showing a power window transmission system of the present invention wherein a slack take-up device constructed in accordance with a second embodiment of the present invention is incorporated.
Figure 14:
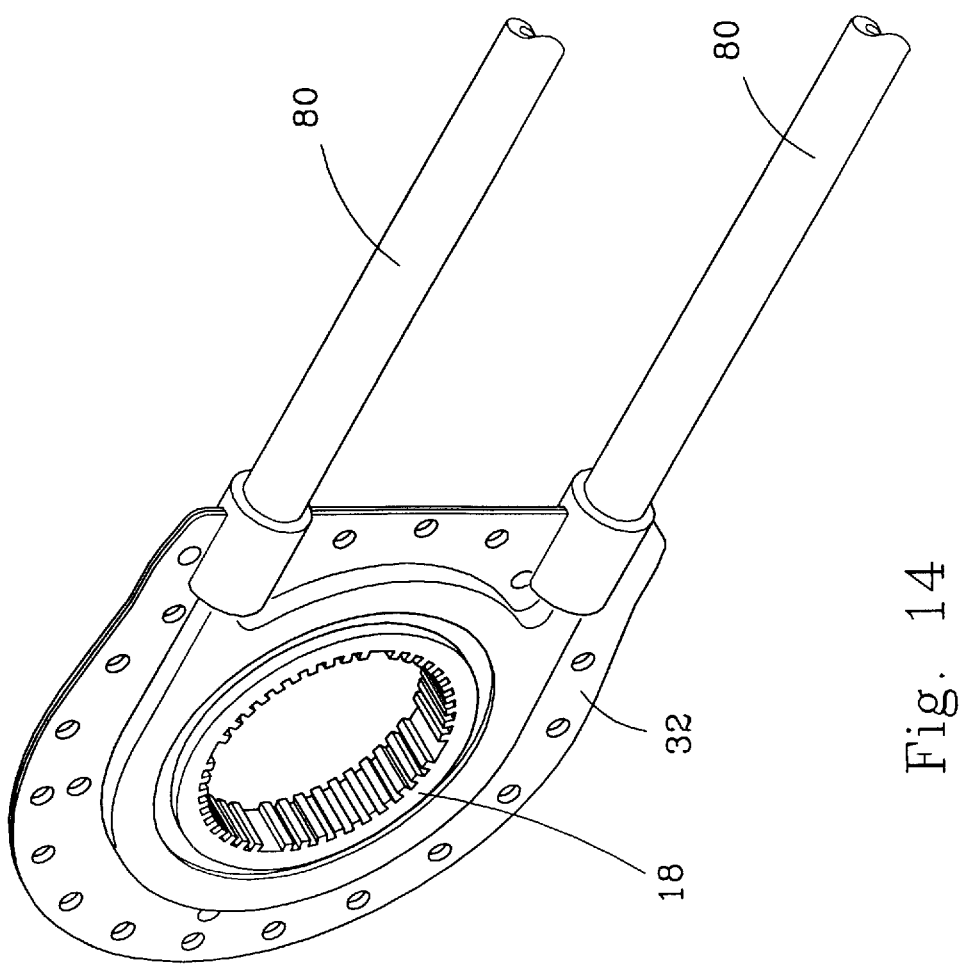
FIG. 14 is an enlarged perspective view of the window crank handle side structure of the power window transmission system with the slack take-up device in accordance with the second embodiment of the present invention incorporated therein.

As shown in FIG. 13, the second embodiment power transmission system 10' comprises an endless chain 12 (see FIGS. 16 and 17) engaging and surrounding a driving sprocket 20 and a driven sprocket 18 which are spaced from each other and housed in a casing 34 or 32. A flexible tube 80 is provided over each of the chain extents between the sprockets 18 and 20.

A motor 26 is coupled to the driving sprocket 20 via a mechanical coupling device 28 to drive the chain 12. The driven sprocket 18 is coupled to a window crank handle shaft (not shown) to open/close the car window.

With reference to FIGS. 14–17, the casings 32 and 34 that house the sprockets 18 and 20 are identical to each other, each defining therein a central circular through hole and radially spaced from and surrounding the hole, an annular chain channel 50 (FIGS. 16 and 17) through which the chain 12 extend to engage the sprockets 18 and 20. Each of the casing 32 or 34 is provided with two entry bores 51 for receiving respective ends of the tubes 80. A slack take-up device, designated at reference numeral 81' (see FIG. 15), is received within each of the two entry bores 51 of for example the handle side casing 32 to take up the slack of the tubes 80 following change of length of the chain extents between the casings 32 and 34.

Figure 15:
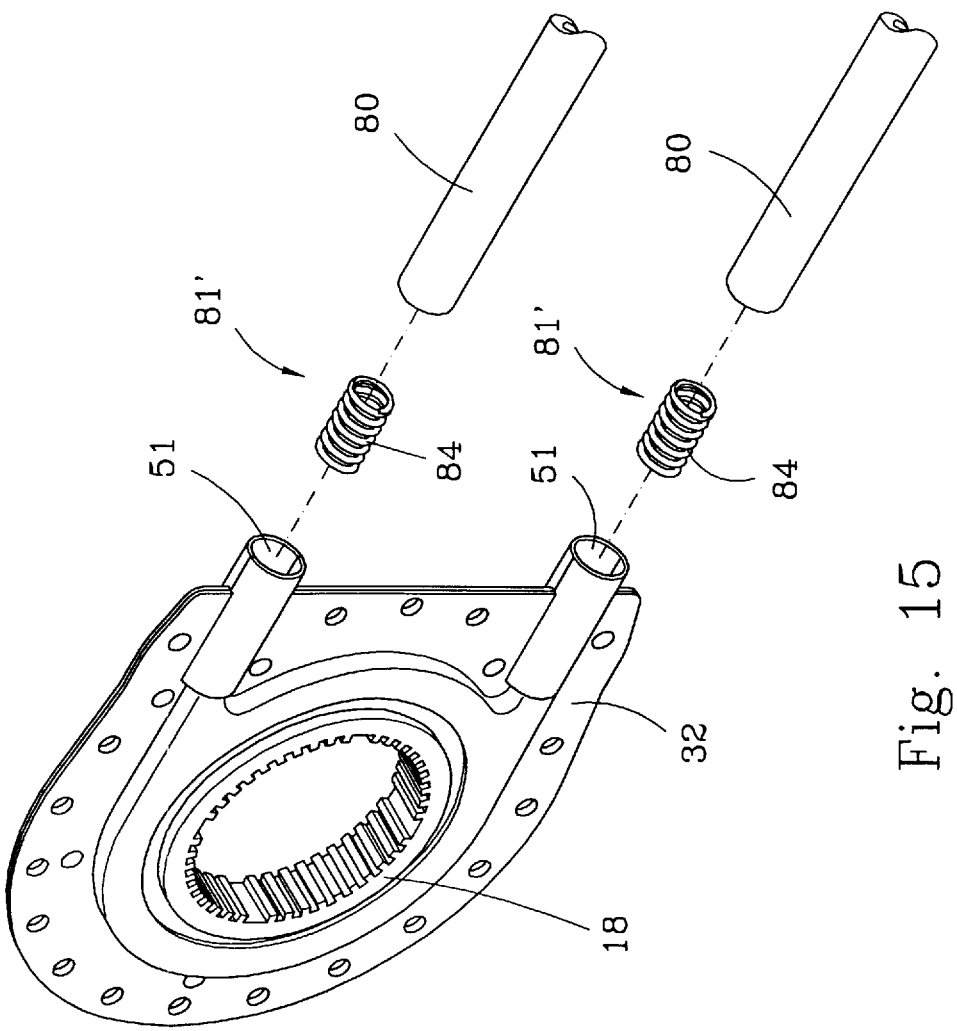
FIG. 15 is an exploded perspective view of the window crank handle side structure of the power window transmission system showing the structure of the slack take-up device in accordance with the second embodiment of the present invention.

As shown in FIGS. 15–17, the second embodiment slack take-up device 81' comprises a pre-compressed helical spring 84 received within the respective entry bore 51 with an inner end thereof supported in the entry bore 51 and an opposite outer end abutting against the respective end of the tube 80. As indicated by arrows shown in FIG. 17, the spring 84 allows the end of the tube 80 to be movable relative to the casing 32 between the first position and the second position, as is described in detail previously, to take up slack occurring on the tubes 80 when the lengths of the chain extents between the sprockets 18 and 20 are changed due to for example adjustment or wearing of the power window transmission system 10'.

The second embodiment slack take-up device 81' illustrates a simplified structure, as compared to the first embodiment slack take-up device 81, but achieves the same function of taking up slack of the tubes 80.

I claim:

1. A power window transmission system comprising an endless chain surrounding and engaging spaced apart driving and driven sprockets, the sprockets each being housed in an associated casing having opposed walls thereto, each casing including a central circular aperture therethrough and, radially spaced from, and surrounding said aperture, an annular chain channel, the opposed annular portions of the walls of the casing between the aperture and the chain channel defining a space to allow the teeth of the associated sprocket to extend therethrough and into the chain channel, a circumferential rim being provided along the central circular aperture to be in engagement with and movably support thereon a circumferential shoulder formed on the associated sprocket, whereby said sprocket is rotatably supported in the casing, each of the casings comprising a lip formed around an inner circumference of the circumferential rim to extend radially inwardly thereof to support the associated sprocket against axial thrust applied thereto, two parallel extension channels extending tangentially from each chain channel to the edge of the associated casing to provide entry and exit means for the chain to and from said casings, a pair of opposed flexible tubes being provided over the exposed extents of chain between the two casings, and , for each tube, a slack take-up device reacting between an end of the tube and the adjacent extension channel of the associated casing and adjustable to accommodate, together with the associated flexible tube, any length change of the chain extent therein.

2. The power window transmission system as claimed in any one of claim 1, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

3. A power window transmission system comprising a loop-like endless chain and a driving sprocket and a driven sprocket engaging the chain, the sprockets being spaced from and opposite to each other and rotatable about respective rotational axes, the driving sprocket being mechanically coupled to and driven by a motor to move the chain which in turn drives the driven sprocket, wherein the driving sprocket and the driven sprocket are encased in a casing, each casing having a circular hole and an annular chain channel with a gap communicating between the circular hole and the chain channel for rotatably supporting the respective sprocket therein by having sprocket teeth extending through the gap into the chain channel and a circumferential shoulder formed on the sprocket movably supported and in contact engagement with a circumferential rim formed along the circular hole, each of the casings comprising a lip formed around an inner circumference of the rim to extend radially inwardly thereof to support the associated sprocket against axial thrust applied thereto, two extension channels tangential to the annular chain channel and parallel with each other, extending from the annular chain channel to an edge of the casing to each define an entry bore at the edge of the casing for allowing the chain to extend into the chain channel, the chain comprising two side sections each extending from each of the entry bores of the driving sprocket casing to the corresponding entry bore of the driven sprocket casing with a flexible enclosure tube surrounding each of the side sections of the chain, each of the tubes having a first end over which a sheath is tightly mounted and snugly received within each of the entry bores of one of the casing and a second end on which a slack take-up device is mounted to connect the second end of the tube to a respective entry bore of the other one of the casings so as to allow the second end of the tube to be movable between a first position where the second end of the tube is close to the casing and a second position where the second end of the tube is moved away from the casing for accommodating length change of the chain.

4. The power window transmission system as claimed in any one of claim 3, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

5. The power window transmission system as claimed in claim 3, wherein the sheath is made of a rigid material tightly secured on the first end of each of the tubes.

6. The power window transmission system as claimed in claim 5, wherein the slack take-up device comprises a cylindrical plug having a central bore to tightly fit onto the second end of the tube and movably received within the respective entry bore with the chain extending through the central bore to enter the entry bore, a biasing element being provided between the plug and the entry bore to bias the plug to move relative to the casing from the first position to the second position.

7. The power window transmission system as claimed in any one of claim 6, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

8. The power window transmission system as claimed in claim 6, wherein the biasing element is a helical spring encompassing the plug with a first end thereof supported on a circumferential flange of the plug and wherein the slack take-up device further comprises a spring holder having a central through hole to fit onto the entry bore and receive a portion of the plug therein, an inner circumferential flange being provided within the central through hole to support an opposite end of the helical spring.

9. The power window transmission system as claimed in any one of claim 8, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

10. The power window transmission system as claimed in claim 8, wherein the plug comprises a reduced section movably extending through the central through hole of the spring holder and received within the entry bore, the reduced section defining a circumferential shoulder abutting against the inner circumferential flange of the spring holder to define the first position.

11. The power window transmission system as claimed in any one of claim 10, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

12. The power window transmission system as claimed in any one of claim 5, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

13. The power window transmission system as claimed in claim 5, wherein the slack take-up device comprises a biasing element disposed between the second end of the tube and the respective entry bore to bias the second end of the tube to move relative to the casing from the first position to the second position.

14. The power window transmission system as claimed in any one of claim 13, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

15. The power window transmission system as claimed in claim 13, wherein the biasing element is a helical spring received inside the respective entry bore and having a first end thereof supported in the entry bore and a second end abutting against the second end of the tube.

16. The power window transmission system as claimed in any one of claim 15, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

17. The power window transmission system as claimed in claim 3, wherein the slack take-up device comprises a cylindrical plug having a central bore to tightly fit onto the second end of the tube and movably received within the respective entry bore with the chain extending through the central bore to enter the entry bore, a biasing element being provided between the plug and the entry bore to bias the plug to move relative to the casing from the first position to the second position.

18. The power window transmission system as claimed in any one of claim 17, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

19. The power window transmission system as claimed in claim 17, wherein the biasing element is a helical spring encompassing the plug with a first end thereof supported on a circumferential flange of the plug and wherein the slack take-up device further comprises a spring holder having a central through hole to fit onto the entry bore and receive a portion of the plug therein, an inner circumferential flange being provided within the central through hole to support an opposite end of the helical spring.

20. The power window transmission system as claimed in any one of claim 19, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

21. The power window transmission system as claimed in claim 19, wherein the plug comprises a reduced section movably extending through the central through hole of the spring holder and received within the entry bore, the reduced section defining a circumferential shoulder abutting against the inner circumferential flange of the spring holder to define the first position.

22. The power window transmission system as claimed in any one of claim 21, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

23. The power window transmission system as claimed in claim 3, wherein the slack take-up device comprises a biasing element disposed between the second end of the tube and the respective entry bore to bias the second end of the tube to move relative to the casing from the first position to the second position.

24. The power window transmission system as claimed in any one of claim 23, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

25. The power window transmission system as claimed in claim 23, wherein the biasing element is a helical spring received inside the respective entry bore and having a first end thereof supported in the entry bore and a second end abutting against the second end of the tube.

26. The power window transmission system as claimed in any one of claim 25, further comprising a bracket member having an end configured to fasten to each of the casings, the bracket member having an elongated slot formed thereon to slidably receive therein a slide block, the slide block having a threaded through hole for threadingly engaging a bolt which partially extends out of the threaded through hole and adapted to engage and fasten to an external threaded hole to secure the bracket thereon, the slide block being positioned along the elongated slot of the bracket member by tightening the bolt.

* * * * *